United States Patent [19]

Rutgersson

[11] Patent Number: 4,670,948
[45] Date of Patent: Jun. 9, 1987

[54] STOPPING ARRANGEMENT FOR LONG DRAWING ELEMENTS

[76] Inventor: Göran Rutgersson, Ekebacken, S-440 30 Marstrand, Sweden

[21] Appl. No.: 874,133

[22] Filed: Jun. 13, 1986

[30] Foreign Application Priority Data

Jun. 20, 1985 [SE] Sweden ............................ 8503077

[51] Int. Cl.4 .............................................. F16G 11/00
[52] U.S. Cl. ............................... 24/136 R; 24/136 A; 403/211
[58] Field of Search ............. 24/136 R, 136 A, 136 B, 24/136 K, 115 M, 115 G; 403/211

[56] References Cited

U.S. PATENT DOCUMENTS

| | | | |
|---|---|---|---|
| 1,218,752 | 3/1917 | Farr | 24/136 A |
| 1,520,716 | 12/1924 | Judd | 24/136 R |
| 1,634,422 | 7/1927 | Holmes | 24/136 R |
| 1,806,844 | 5/1931 | Dennis | 24/136 R |
| 1,815,386 | 7/1931 | Willard | 24/136 R |
| 2,223,132 | 11/1940 | Roberts | 24/136 R |
| 2,516,851 | 8/1950 | Buckley et al. | 24/136 R |
| 3,099,429 | 7/1963 | Broman | 24/136 A |
| 3,709,071 | 1/1973 | Moransais | 24/136 A |
| 3,984,081 | 10/1976 | Hoganson | 24/136 A |
| 4,250,734 | 2/1981 | Tinsley | 24/136 R |

FOREIGN PATENT DOCUMENTS 281548 8/1913 Fed. Rep. of Germany ... 24/136 A

Primary Examiner—Victor N. Sakran

[57] ABSTRACT

A stopping arrangement for long drawing elements such as ropes exhibiting essentially two parallel, opposing clamping surfaces. The clamping surfaces are so arranged as to pull against one another, so that a pressure is exerted on the drawing element when it is moved in a particular direction, and as to move apart, causing the pressure to reduce, when the drawing element is moved in the opposite direction. The aforementioned clamping surfaces extend essentially in a straight line in their principal sense and are so arranged as to move towards and away from one another in a parallel movement. In this way the drawing element will have imparted to it essentially rectilinear clamping over a certain distance at a uniform clamping force, with one of its clamping surfaces being arranged on an element which is so arranged as to move along an oblique path in relation to the second clamping surface, which is situated on a support component connected to the last-mentioned second clamping surface.

5 Claims, 3 Drawing Figures

STOPPING ARRANGEMENT FOR LONG DRAWING ELEMENTS

The present invention relates to a stopping arrangement for long drawing elements such as ropes exhibiting essentially two parallel, opposing clamping surfaces so arranged as to pull against one another, so that a pressure is exerted on the drawing element when it is moved in a particular direction, and as to move apart, causing the pressure to reduce, when the drawing element is moved in the opposite direction.

For the purpose of stopping and securely locking ropes, for example, various stopping arrangements are available which are more or less dependable. In the simplest design the rope is securely clamped between two oblique surfaces by its own pulling force, although this is associated with the risk of the rope easily jumping out of the stopping arrangement, In the more advance designs the rope is clamped between a plate and an expansion roller, which is adjusted by means of a lever. The latter design involves the rope being subjected to a high load on a small surface area, which increases the risk of damage to the rope.

Such stopping arrangements are encountered in large numbers exhibiting a wide range of variations within the sport of sailing, for example. Certain types of stopping arrangement exhibit an expansion roller, as previously mentioned, which is adjusted by means of a lever. A sailing boat has a large number of ropes, all of which perform different functions primarily in conjunction with the propulsion of the boat. In conjunction with this these ropes are preferably brought together in the vicinity of the cockpit of the boat, where they are arranged together with the aforementioned stopping arrangements alongside one another. As previously mentioned, the ropes serve different functions for which ropes of different thickness are required. Because the ropes run between the plate and the expansion roller in the stopping arrangement, any variation in the thickness of the ropes will affect the position of the levers, causing them to point in different directions. As a result it is difficult to determine at a glance which of the levers is regulating the pressure on a particular rope. The wrong lever may be adjusted as a consequence of this, which could lead to the situation in which, for example, the main sail of the boat filled with wind is lowered with a resulting reduction in the manoeuvrability of the boat and lost time when racing.

The object of the prevent invention is to increase the size of the surface which securely clamps the long drawing element in order to reduce the wear and deformation of same.

A further object of the present invention is to accommodate different thicknesses of rope, within certain limits, without having to operate the actuating device.

The aforementioned objects are achieved by means of a stopping arrangement which is characterized in that the aforementioned clamping surfaces extend essentially in a straight line in their principal sense and are so arranged as to move towards and away from one another in a parallel movement so that the drawing element will have imparted to it essentially rectilinear clamping over a certain distance at a uniform clamping force, with one of the clamping surfaces being arranged on an element which is so arranged as to move along an oblique path in relation to the second clamping surface, which is situated on a frame component connected to the last-mentioned clamping surface.

The invention is described below in more detail in terms of an illustrative embodiment with reference to the accompanying drawing, in which.

Figure 2:
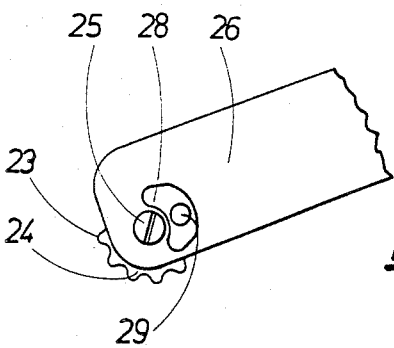
FIG. 2 shows a partially exposed side view of an actuating device for the stopping arrangemnt.
Figure 1:
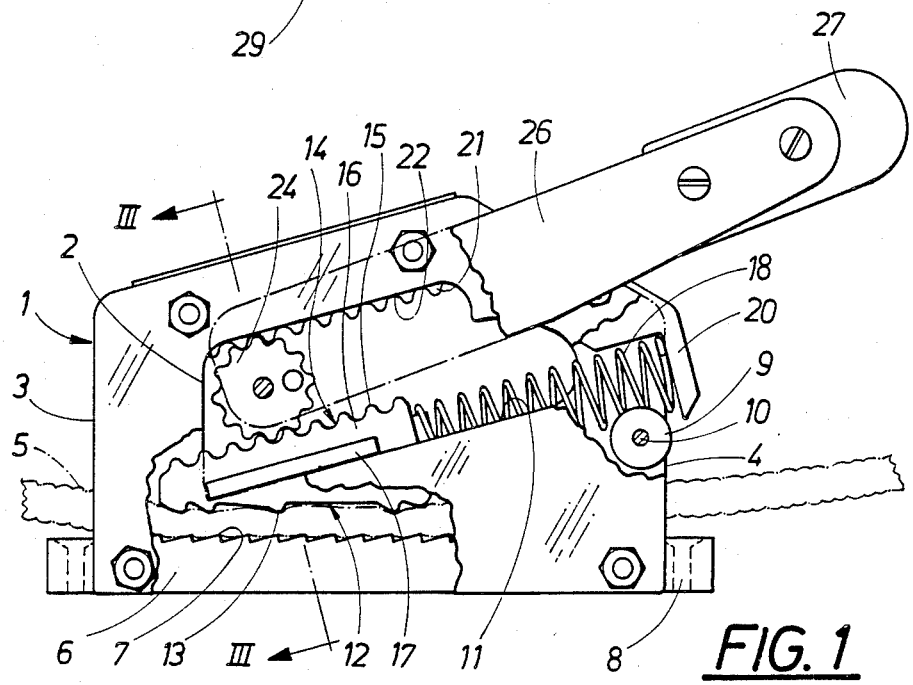
FIG. 1 shows an exposed side view of the stopping arrangement with a rope passing through it.
Figure 3:
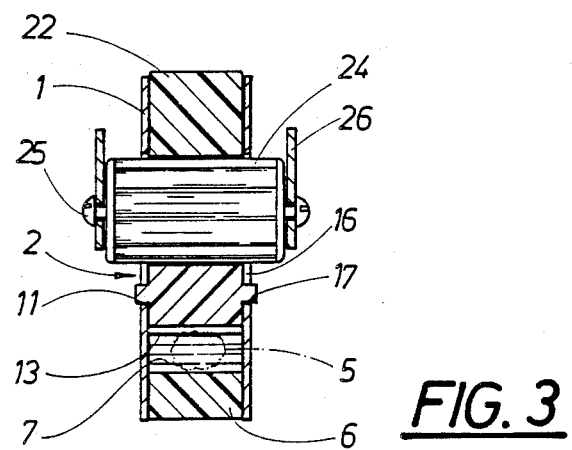
FIG. 3 shows a section along the line III—III in FIG. 1 through the stopping arrangement.

As will be appreciated from the example illustrated in FIGS. 1, 2 and 3, the stopping arrangement exhibits a rectangular protective cover 1 which exhibits recesses 2 on both its long sides and openings 3, 4 on its short sides, in which case one of the openings constitutes an entrance opening 3 and the other opening constitutes an exit opening 4 for a rope 5. The aforementioned protective cover also exhibits a base plate 6 extending between the openings 3, 4 and exhibiting inclined teeth 7. The base plate projects slightly from the short sides of the protective cover and in so doing exhibits recessed screw holes 8 on the projecting sections. A roller 9 is also mounted in such a way that it is free to rotate about a shaft 10 close to the exit opening 4 on one of the short sides of the protective cover. The recesses 2 in the protective cover are also so executed that their bases form a sliding surface 11 at an angle to the base plate 6 for a wedge-shaped device, which is referred to in the following as the clamping element 16. The clamping element 16 is provided on one surface 12 with teeth 13 of a different kind, preferably with irregular spacing, and with teeth 15 on a second surface 14. There are present on the sides of the clamping element two bosses 17 which rest on the sliding surfaces 11 of the recesses 2. It is also possible to replace the aforementioned bosses with at least two spigots arranged on either side of the clamping element 16 and intended to run in parallel grooves, which are not illustrated in the drawings and which correspond to the number of spigots, arranged on the insides of the protective cover 1. The clamping element is actuated by a spring 18 installed between a spigot 19 projecting from one end of the clamping element and an end piece 20 on the protective cover. In the upper part of the protective cover 1 is a toothed supporting surface 21, arranged on a toothed plate 22, which is securely attached inside the protective cover. The aforementioned supporting surface of the toothed plate 22 and the upper side of the clamping element 16 are parallel to their respective toothed surfaces 21 and 14. The surfaces 12 and 14 of the clamping element, on the other hand, adopt an acute angle to one another.

An actuating roller 24 provided with teeth 23 is installed between the clamping element 16 and the teeth of the toothed plate 22 and is attached by means of a shaft 25 to one end of a lever arm 26 which extends with two side components on the outside of the protective cover 1, as shown in FIG. 3, said lever arm being capable of being pivoted together with the actuating roller 24. A handle 27 is securely attached to one end of the lever arm, and a curved second recess 28 is arranged on the opposite end of the lever arm close to the attachment point for the actuating roller. The recess is arranged at a certain distance from the shaft 25 on which the actuating roller 24 is arranged, in conjunction with which the actuating roller has projecting from its side a driving spigot 29 which runs in the recess 28.

The stopping arrangement shown in the illustrative embodiment is used primarily on sailing boats, to which it is securely attached by means of screws which pass through the screw holes 8 in the base plate 1 so that the stopping arrangement is provided in this way with a solid means of attachment to the sailing boat enabling it to withstand the high stresses which can arise. In this way the stopping arrangement is installed on the sailing boat in an upright position, as illustrated in FIG. 1, with its longitudinal sense running in the imaginary longitudinal sense of the path of a rope. The rope 5 is inserted from the front through the entrance opening 3 on one of the short sides of the protective cover and is passed through the protective cover between the surface 12 of the clamping element 16 and the base plate 6, leaving via the exit opening 4 on the other short side of the protective cover. The operation of feeding the rope through is facilitated by the fact that it is able to run against the roller 9, which in turn rotates about the shaft 10 installed at the exit opening of the protective cover. The inclined teeth 7 on the base plate 6 and the inclined teeth 13 on the clamping element 16 are set at an angle such that the rope slides easily over the teeth as it is introduced, but such that the teeth will take hold of the rope as a tensile load is applied to it. The force exerted by the clamping element against the rope will increase in line with the tensile load applied to it. The rope is usually clamped along a short part of its overall length, and fatigue occurs in the rope at these points after a time, causing its elasticity to reduce. This means that the rope becomes hard, and that it is more difficult for the teeth of the clamping element and the base plate to take hold of the rope. By executing the clamping element with teeth whose distance relative to one another varies, it is possible to avoid even clamping of the rope over a long distance. The rope 5 is instead subjected by the teeth 13 of the clamping element at a number of individual points to a compressive load, which means that the rope is more easily able to regain its elasticity after having been compressed. The number of teeth is entirely adequate to permit the rope to be clamped, and the force exerted by the clamping element 16 on the rope 5 will increase in line with the increased tensile load applied to it.

The stopping arrangement is capable of being modified to accommodate ropes of different diameters by the clamping element 16 being capable of being displaced along the sliding surface 11 which is set at an angle to the base plate 6; its mobility is increased by the toothed upper side 14 of the clamping element running against the teeth 23 of the actuating roller 24, which in turn run against the toothed plate 22. When in its inactive position the clamping element is situated at a specified minimum distance from the base plate 6 and is caused by the spring 18 arranged between the spigot 19 and the end piece 20 to adopt an end position along the sliding surface 11. The specified minimum distance between the clamping element 16 and the base plate 6 is required for this purpose to be smaller than the diameter of the smallest rope for which the stopping arrangement is intended. As the rope is fed through in the manner previously described, the clamping element 16 will adapt to the diameter of the rope 5 which is introduced in such a way that the clamping element on its bosses 17 will slide up the sliding surface 11, in conjunction with which the spring will act as a progressive resistance. The movement of the clamping element along the sliding surface 11 will cause the surface 12 of the clamping element to be displaced in parallel relative to the base plate 6.

As the clamping element slides along the sliding surface 11, the actuating roller will be caused to rotate about the shaft 25 against the teeth 15 of the clamping element and against the toothed plate 22 of the supporting surface. The actuating roller will in this case exhibit a certain restricted clearance relative to the lever arm 26 before the latter is actuated. This is achieved by the movement of the driving spigot 29 in the recess 28 arranged on the lever arm, in conjunction with which the length of the recess 28 is specified so that a desired range of rope diameters can be accommodated without the clamping element in the course of its displacement actuating the lever arm 26. It is possible, in spite of this, by taking hold of the handle 27 of the lever arm 26 and by moving the lever arm 26 in an upward and forward direction, to cause the driving spigot 29 of the actuating roller 24 to come up against the end of the recess 28. The actuating roller 24, which is now caused to move by the arm, will roll against the teeth 15 of the clamping element 16 and the teeth of the toothed plate 22 and will force the clamping element to move up along the sliding surface 11, thereby reducing the strength of its grip on the rope 5 so that the rope can be withdrawn from the stopping arrangement. If the rope is subjected to a tensile force, the withdrawal of the rope can be braked by means of the lever arm in such a way as to regulate the force acting upon the rope.

This restricted clearance of the actuating roller means that, whenever the clamping element is in engagement with the rope, the lever arm will always be situated in its end position, as illustrated in FIG. 1, irrespective of the diameter of the rope within the predetermined range of diameters. Since a number of stopping arrangements are installed alongside one another, it is easier in this way to determine at a glance which lever arm belongs to a particular rope.

An arrangement which operates with very low friction is achieved through the embodiment described here. The sliding between the sliding surfaces 11 and the bosses 17 is, in actual fact, only determinative for the idling friction, whereas the clamping element 16, on being clamped to a rope, is forced upwards and will come to rest against the actuating roller 24. This roller will then act not only as a kind of rectilinear roller bearing, but also as a toothed gearing to cause the elements to be displaced. The aim in this case is to achieve gentle operation in conjunction with low friction, and at the same time to provide an adequate grip for the aforementioned displacement. In order to achieve this the teeth should not be executed in the manner which is applicable to the driving gears in a toothed gearing, but rather as a profile with softly rounded tops and bottoms. Experiments have shown that, when an attempt is made to withdraw the rope, the clamping element 16 immediately adopts a locking position and locks the rope 5 very effectively over a long distance with a compressive loading applied at a number of individual points without causing any damage to the rope. As the rope is introduced through the stopping arrangement, the clamping element is raised very easily through the fact that the teeth 7, 13 of the clamping element and the base plate have rounded tops, without exhibiting any tendency to jamming resulting from previous withdrawal. The clamping element can be caused to move just as easily by means of the lever arm 26.

The arrangement can be executed in ways other than those indicated in the accompanying drawings. The aforementioned roller bearing function and toothed wheel function can thus be separated in such a way that the roller is cylindrical at its centre, for example, whereas it exhibits toothed wheels at both its sides which engage in corresponding toothed racks, in which case the cylindrical part and the toothed part should exhibit the same rolling diameter. The racks for the roller need not be straight, but may be curved so as to provide a progressive clamping force, preferably with a greater clamping force being provided for thicker ropes. The use of non-round toothed wheels is also possible so as to provide progressive locking.

In the case of steel ropes the elements can be executed with grooved recesses in order to avoid any flat clamping of the steel rope. The bending of the steel rope which occurs with eccentric stopping arrangements cannot take place.

The invention is not restricted to the illustrative embodiment described above and shown in the drawings, but may be modified within the scope of the following patent claims.

I claim:

1. A clamping device for longitudinal elements such as ropes comprising a body portion including two side plates forming a space in between them, a first clamping member attached to the side plates and provided with a clamping surface extending between the side plates in said space, a second clamping member provided with a clamping surface facing the clamping surface of the first member, the second member being movable in the space between the side plates along a path extending such that the clamping surface of the second member is moved towards the clamping surface of the first member when the second member is moved along said path in a first direction and is moved away from the clamping surface of the first member when the second member is moved along said path in a second direction, the second member further being provided with a first cogged surface on the side of the member opposite to its clamping surface and being substantially parallel to the moving path of the member, a support member attached to the sideplates and positioned in said space and provided with a second cogged surface substantially parallel to the first cogged surface of the second member and facing the same at a distance from the same, a cogged roller between the two cogged surfaces and meshing with the same, said cogged roller being free to roll along the cogged surfaces upon movement of the second member in said path, an actuating means in driving connection with the cogged roller, and the second member provided by being moved along said path to be supported, while clamping a longitudinal element, by the support member via the first cogged surface, the cogged roller and the second cogged surface.

2. A clamping device according to claim 1 wherein the second member is guided along said path by being supported in one direction by said roller and in the opposite direction by a guiding means including a sliding surface on each of the side plates.

3. A clamping device according to claim 1 or 2 wherein the second member is biased by a spring to move along said path in said first direction and thereby towards the clamping surface of the first member.

4. A clamping device according to claim 1 or 2 wherein the actuating means has a restricted clearance relative to the roller.

5. A clamping device according to claim 3 wherein the actuating means has a restricted clearance relative to the roller.

* * * * *